Oct. 14, 1969  R. N. PATERSON  3,472,537
PIPE CLAMP HAVING SIDE OUTLET
Filed Aug. 1, 1967  3 Sheets-Sheet 1
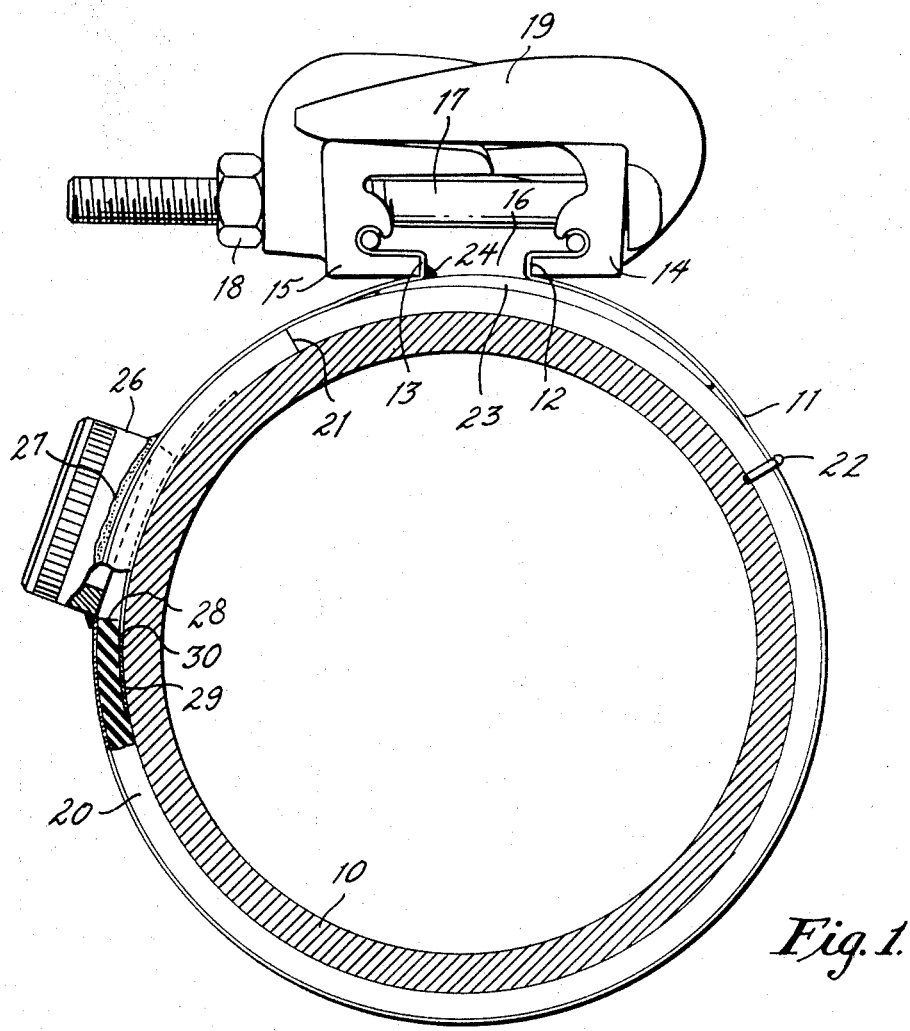
Fig.1.
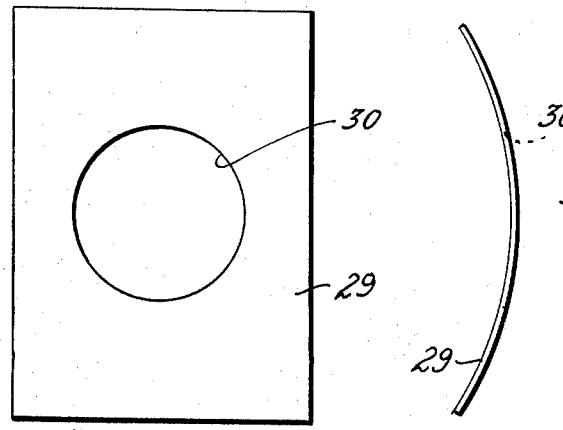
Fig.4.
Fig.5.
INVENTOR.
ROBERT N. PATERSON Oct. 14, 1969    R. N. PATERSON    3,472,537
PIPE CLAMP HAVING SIDE OUTLET
Filed Aug. 1, 1967    3 Sheets-Sheet 2

INVENTOR.
ROBERT N. PATERSON

Oct. 14, 1969  R. N. PATERSON  3,472,537
PIPE CLAMP HAVING SIDE OUTLET
Filed Aug. 1, 1967  3 Sheets-Sheet 3

INVENTOR.
ROBERT N. PATERSON
BY
ATTORNEY

United States Patent Office 3,472,537
Patented Oct. 14, 1969

3,472,537
PIPE CLAMP HAVING SIDE OUTLET
Robert N. Paterson, Bradford, Pa., assignor to Dresser Industries, Inc., Dallas, Tex., a corporation of Delaware
Continuation-in-part of application Ser. No. 457,348, May 20, 1965. This application Aug. 1, 1967, Ser. No. 662,256
Int. Cl. F16l *19/00, 21/00, 23/00*
U.S. Cl. 285—197                    6 Claims

ABSTRACT OF THE DISCLOSURE

A clamp for the repair or coupling of pipe providing a side outlet service connection which can be located at a circumferential gap either in a pipe wall or formed between joined pipe sections. The clamp is comprised of a tightenable encircling band containing an elastomeric gasket for bearing against the pipe surface. In the vicinity of and surrounding the side outlet opening, the gasket is supported by a strip member which prevents gasket droop at the gap through which pressurized pipe line contents could otherwise escape to the clamp exterior.

CROSS-REFERENCES TO RELATED APPLICATIONS

This application is a continuation-in-part of application Ser. No. 457,348 filed May 20, 1965.

BACKGROUND OF THE INVENTION

The field of art to which the invention pertains includes the art of Pipe, Joints or Couplings in Patent Office Class 285.

Clamps for the repair or coupling of pipe, hose or the like are well known and are in wide commercial use. Exemplifying the art are Patents U.S. 2,375,921; 2,895,-197; 3,104,898; 3,209,427 each disclosing a form of pipe clamp suitably intended by the patentee for a particular purpose. Generally these clamps consist of an adjustable outer band inwardly containing an elastomeric gasket which is applied overlying the pipe surface area whereat sealing is to be effected. The sealing purpose of these prior art devices ordinarily consists of either repair of a puncture, break, fracture or other unwanted gap opening in the pipe wall through which line contents could escape or for sealing the gap formed between pipe sections when coupled into a continuous piping system. Therefore, where the closure to be effected by the clamp has been of any of the aforementioned gap varieties, the clamps commercially available have in varying degrees been suitable in effecting the desired closure result.

It is frequently required, however, in a piping system, to provide side outlets for branch service connections and to locate these outlets within the limits of the aforementioned gap types. Whether by choice as by precasting the opening at mating pipe ends or by purpose as by tapping the pipe thereat, it has not been known how to successfully clamp the pipe in the vicinity of the side outlet in order to maintain a pressure tight seal. Hence where the gap extends partially or completely in a circumferential direction in communication with the outlet opening it has not been possible with these prior art clamp devices to effect a satisfactory closure in a manner whereby leakage will not occur to the exterior of the clamp. This can perhaps be better understood when considering the fundamental premise that a pipe clamp to be effective must be in sealing engagement with all avenues of escape between any opening and the exterior. Where however, a circumferential gap exists in communication with a laterally extending pipe opening, the gasket portion of the prior art clamps overlying the gap are caused to droop, sag or otherwise be unsupported thereat. This situation has permitted pressurized line contents at the opening to laterally enter between the gasket and its outer band and eventually escape past the clamp joint at the outer ends of the band.

SUMMARY

The present invention relates to clamps for the repair or coupling of pipe and is concerned primarily with such a clamp having an outlet connection suitable for locating at a position intercepting a circumferential gap in a pipe wall.

A pipe repair clamp of the type with which this invention is concerned has now assumed a fairly well standardized and conventional form. In the prior art is consists essentially of a flexible metallic band having spaced ends, a lug assembly on each band end, nuts and bolts for drawing the lug assembly together to tighten the band, a gasket carried by the band on its inner face, and an outer spanner secured to one band end and bridging the space between ends. As the band is tightened, the gasket is compressed to form a seal about any break in the pipe.

By constructing such a clamp modified in accordance with the invention hereof, it has been found that a side outlet connection can be provided through a pipe wall intercepting a gap thereat without the leakage problems associated with prior art clamp devices. Therefore, when constructed in the manner hereof, the clamp can be used without regard to whether a side outlet is wanted or not and where wanted, without regard to whether the outlet is to be located interposed or remote from any pipe gap. When the side outlet is unwanted, it can be merely capped or in some situations sufficiently displaced from the repair area. In any event, the capability hereof enhances the clamp versatility by enabling its use under conditions for which prior art clamps were entirely unsuitable.

It is therefore an object of the invention to provide a novel clamp for the repair or coupling of pipe.

It is a further object of the invention to provide a novel clamp as in the last recited object with a side outlet connection suitable for locating in a circumferential pipe gap without the attendant leakage problem associated with clamps of the prior art.

These and other objects of the invention are achieved in accordance with the invention with a clamp which comprises a flexible metallic band having spaced ends, means for drawing said ends together, a gasket on the inner face of said band, a side outlet opening angularly displaced from the spaced ends extending through the band and gasket, and a gasket support on the inner face of the gasket surrounding the opening and being of extent sufficient to axially span an elongated circumferential pipe gap in which the side outlet in the pipe is to be located.

For a full and more complete understanding of the invention, reference may be had to the following description and accompanying drawings, wherein:

FIGURE 1 is a section through pipe having a pipe repair clamp in accordance with the invention applied thereto.

FIGURE 4 is a plan view of the gasket support per se.

FIGURE 5 is a view in side elevation of the gasket support per se.

Figure 3:
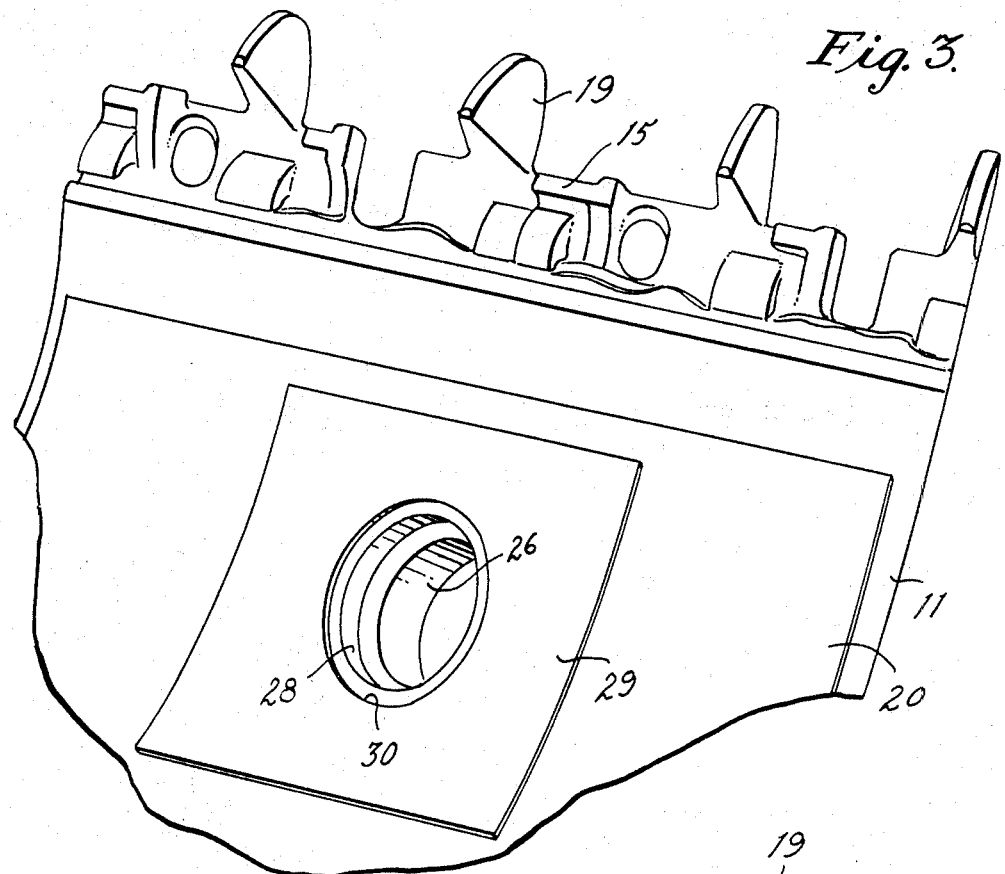
FIGURE 3 is a perspective view of that portion of the clamp which is provided with the gasket support.
Figure 2:
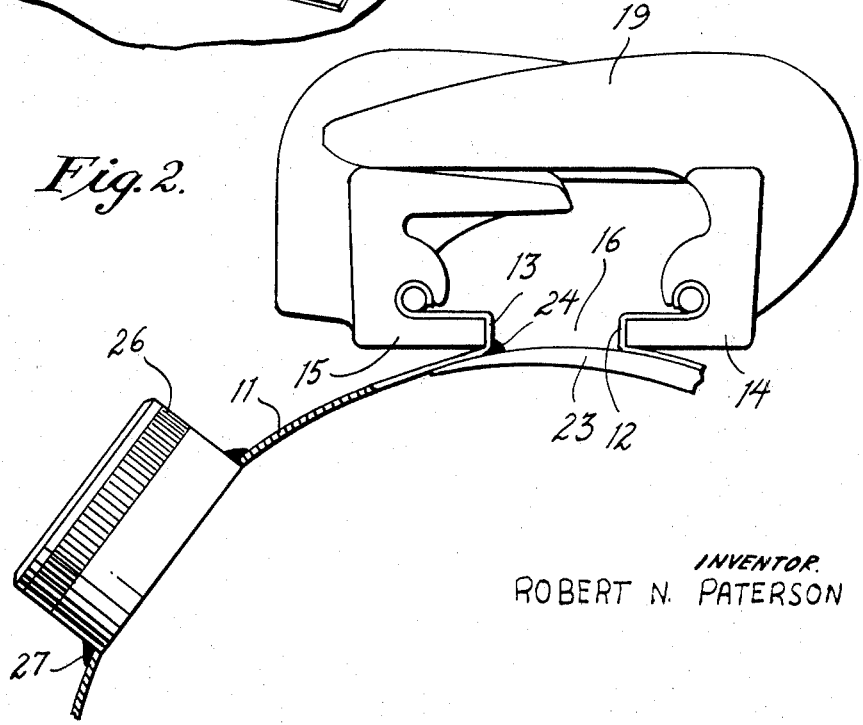
FIGURE 2 is a sectional detail of the outer band portion of the clamp.

Referring now to the drawings and first more particularly to FIGURE 1, the untapped pipe to which the clamp of this invention is applied is shown at 10. It will be understood that the repair clamp may be applied at any place desired on the pipe where it is desired to tap thereinto or where previously provided as aforesaid. This may be either at a gap break in the pipe wall, the gap between meeting ends of two coupled pipe sections, or elsewhere where desired.

The clamp includes a flexible metallic band 11 which may be of any metal having the required properties of strength and flexibility such as stainless steel. The band is of a length sufficient to encircle a pipe as shown with ends turned back at 12 and 13 to provide anchorages for lug assemblies 14 and 15. Thus, the turned back end portions 12 and 13 define a band gap 16. Bolts 17 pass through aligned openings in the lug assemblies and carry nuts 18 which may be tightened to draw the lug assemblies 14 and 15 together. Torque arms 19 prevent the lug assemblies from rolling and insure that they move together with a rectalineal movement.

A gasket 20 of rubber or a comparable elastometer material is carried by the band 11 on its inner face and is generally of uniform thickness throughout. This gasket has ends which meet in a butt joint 21 that is angularly displaced from the band gap 16 and ordinarily is bonded to the inner band face by an adhesive over something less than one-half the gasket extent. Clips shown at 22 retain the gasket in assembled relation with respect to the band.

An outer spanner 23 bridges the band gap 16 and has one end secured to the band 11 as by being welded thereto, where represented at 24. Thus, the spanner 23 together with the band 11 complete a full 360° and provide a complete outside confining area for compressing the gasket.

For enabling a side outlet service connection there is provided an outlet boss shown at 26 and mounted on the outer face of the band 11 at a location angularly displaced from the band gap 16. This boss 26 is preferably welded to the outer face of the band by the weld shown at 27. The band 11 is formed with an aligned opening communicating with a boss 26 as is the gasket formed having an opening 28. Carried on the inner face of the gasket 20 about the opening 28 in any preferred manner, such as by an adhesive, is an inner gasket support 29 formed with an opening 30 also axially aligned with the opening 28. The gasket support 29 more completely illustrated in FIGURES 4 and 5 may be of any rigid material preferably of strip like thickness to completely surround the opening therein while generally conforming to the pipe curvature. Its circumferential or radial extent in the encircling direction of the band as well as its radial extent in the axial direction of the band is usually relatively less than that of the gasket 20. It must, however, where the side outlet through boss 26 is to be located intercepting a pipe gap in communication with the side outlet pipe opening, be of sufficient dimension or area to completely span the gap surrounding the opening. By this means, the gasket support 29 will receive backing from the pipe irrespective of where the outlet is located and will in turn support the gasket against droop where it overlies the gap. Thus, as the nuts 18 are tightened to draw the band ends 14 and 15 together, the gasket will be compressed between the inner gasket support 29 and the band 11 about the gasket opening 28 and insure of a good seal at this location.

Figure 6:
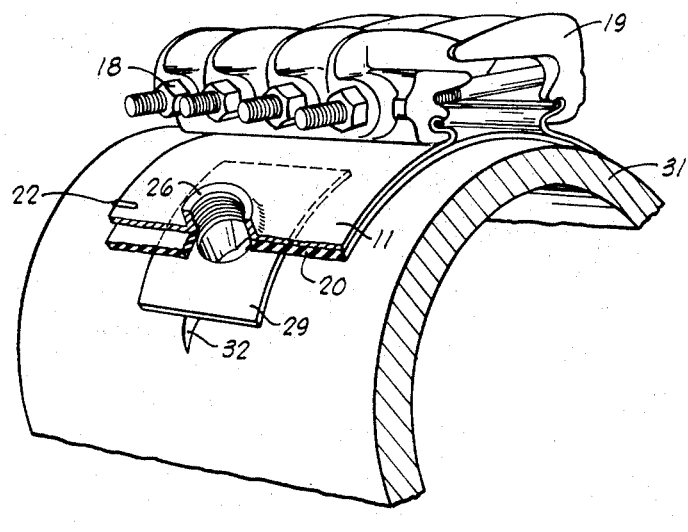
FIGURE 6 is an isometric view broken away and illustrating the clamp hereof for providing a side outlet connection located at a circumferenital crack in a pipe wall.
Figure 7:
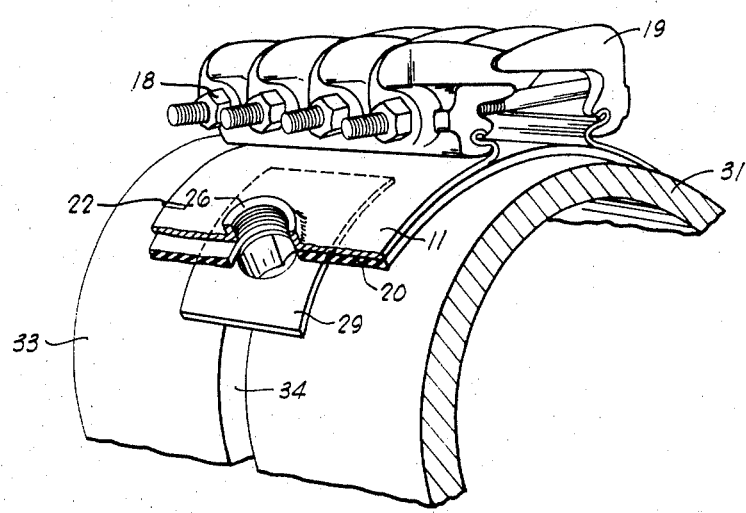
FIGURE 7 is an isometric view broken away and illustrating the clamp hereof for providing a side outlet connection located at a circumferential gap formed between coupled pipe ends.

Installation of this clamp with the side outlet located intercepting a circumferential gap in the pipe wall or between pipe sections is illustrated in FIGURES 6 and 7 respectively. As shown in FIGURE 6, the pipe 31 includes a gap or crack 32 in which an opening has been tapped to supply the connection through boss 26. Likewise in FIGURE 7 the ends of tandem pipe sections 31 and 33 are separated by a gap 34 at which an opening exists or is formed to supply the connection through boss 26. In either situation, the clamp hereof provides a pressure tight seal against leakage.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice.

What is claimed is:

1. A pipe clamp of the type used to connect a laterally extending pipe in juxtaposition with a localized opening in the main pipe for locating the connection at a position where a surface discontinuity forms a gap in the surface of the main pipe in direct communication with the localized opening, comprising the combination of a circularly formable flexible metallic band with opposing ends spaced by a gap, said band having an aperture therethrough displaced from said end gap and a lug assembly joining the ends thereof, said lug assembly being capable of being drawn together for inward tightening of the band, a spanner within said band and bridging said end gap to be inwardly tightened by said band ends as said band is tightened by said lug assembly, an elastomeric gasket secured to the inner face of said band for encircling engagement against the surface of pipe being clamped and having an aperture therethrough in aligned relation with the aperture of said band, said band and gasket being in continuous uninterrupted contact between the common facing surfaces thereof, and a strip member generally conforming to pipe curvature mounted on the inner face of said gasket to support the gasket when locally engaged against a pipe surface thereat, said strip member having an aperture therein in aligned relation with said previous apertures, a circumferential extent in the encircling direction of the band of less than said gasket and an axial extent less than said gasket but at least sufficient to span the pipe gap communicating with the localized pipe opening in pipe on which the clamp is applied.

2. The pipe clamp of claim 1 together with a boss that is mounted on the exterior of said band at said aligned openings.

3. The pipe clamp of claim 1 together with a boss that is welded to said band at the opening therein.

4. The pipe clamp of claim 1 in which said strip member has a curvature corresponding to that of the pipe about which the clamp is to be applied.

5. A pipe clamp of the type used to connect a laterally extending pipe in juxtaposition with a localized opening in the main pipe for locating the connection at a position where a surface discontinuity forms a gap in the surface of the main pipe in direct communication with the localized opening, comprising the combination of a circularly formable flexible metallic band containing an elastomeric gasket, said band when circularly formed having opposing ends spaced by a gap with the gasket arranged to encircle in embracing relation against a pipe to be clamped, said gasket being secured to the inner face of said band in continuous uninterrupted contact between the common facing surfaces thereof with each of said band and gasket having apertures therethrough in aligned relation and displaced from said end gap, a lug assembly on each end of said band capable of being drawn together for inward tightening of the band, a spanner within said band and bridging said end gap to be inwardly tightened by said band ends as said band is tightened by said lug assembly, and a strip member generally conforming to pipe curvature mounted on the inner face of said gasket to support the gasket when locally engaged against a pipe surface thereat, said strip member having an aperture therein in aligned relation with said previous apertures and an axial and circumferential extent less than said gasket but at least sufficient to maintain uniform support of the gasket over a pipe gap where communicating with a localized opening in a pipe on which the clamp is applied.

6. In the pipe clamp of claim 5 in which the outer surface of said band includes means providing for a side outlet service connection through said apertures.

References Cited

UNITED STATES PATENTS

| | | | |
|---|---|---|---|
| 1,937,793 | 12/1933 | Seaberg | 285—199 |
| 2,146,336 | 2/1939 | Frey | 285—197 X |
| 2,778,661 | 1/1957 | Leighton | 285—367 X |
| 3,355,794 | 12/1967 | Adams | 285—197 X |

DAVID J. WILLIAMOWSKY, Primary Examiner

W. L. SHEDD, Assistant Examiner

U.S. Cl. X.R.

138—99; 285—367, 410, 419, 420